US005812014A

United States Patent [19]
Mazzucco et al.

[11] Patent Number: 5,812,014
[45] Date of Patent: Sep. 22, 1998

[54] DOUBLE HALF-WAVE RECTIFIER CIRCUIT HAVING A WIDE INPUT DYNAMIC RANGE

[75] Inventors: Michelangelo Mazzucco, Santa Maria del Tempio; Giampietro Maggioni, Cornaredo, both of Italy

[73] Assignees: SGS-Thomson Microelectronics S.r.l., Agrate Brianza; Magneti Marelli S.p.A., Milan, both of Italy

[21] Appl. No.: 726,282

[22] Filed: Oct. 4, 1996

[30] Foreign Application Priority Data

Oct. 9, 1995 [EP] European Pat. Off. ............... 95830419

[51] Int. Cl.⁶ .................................................. H01J 19/82
[52] U.S. Cl. ........................... 327/531; 327/547; 327/563
[58] Field of Search ..................... 327/531, 538, 327/547, 560, 563

[56] References Cited

U.S. PATENT DOCUMENTS

| | | | |
|---|---|---|---|
| 4,523,105 | 6/1985 | Jose et al. | 307/261 |
| 4,575,643 | 3/1986 | Sakai | 307/261 |
| 4,745,395 | 5/1988 | Robinson | 340/347 |
| 5,012,139 | 4/1991 | Susak et al. | 307/490 |
| 5,349,521 | 9/1994 | Menegoli et al. | 363/81 |
| 5,477,171 | 12/1995 | Menegoli et al. | 327/87 |

FOREIGN PATENT DOCUMENTS 0599593  6/1994  European Pat. Off. .

OTHER PUBLICATIONS

J. Raminez–Angulo, "BiCMOS Current Buffer–Rectifier," IEEE Transactions on Circuits and Systems I: Fundamental Theroy and Applications, vol. 39, No. 10, Oct. 1992 New York, U.S., pp. 849–851.

Wang, "Full–wave Precision Rectification," IEEE Transactions on Circuits and Systems I: Fundamental Theory and Applications, vol. 39, No. 6, Jun. 1992 New York, U.S.

Toumazou, "Wide–band Precision Rectification," IEEE Proceedings–G, vol. 134, No. 1, Feb. 1987, pp. 7–14.

Sedra & Smith, "Microelectronic Circuits", Saunders College Publishing, Philadelphia, pp. 453–454, 1991.

Gray & Meyer, "Analysis and Design of Analog Integrated Circuits", John Wiley & Sons, Inc., New York, pp. 244–245, 279, 286, 380–381 & 460–461, 1993.

*Primary Examiner*—Timothy P. Callahan
*Assistant Examiner*—Jeffrey Zweizig
*Attorney, Agent, or Firm*—Allen, Dyer, Doppelt, Milbrath & Gilchrist, P.A.

[57] ABSTRACT

A double half-wave rectifier circuit with earth shift using an input differential amplifier and two current mirrors in cascode configuration in such a way that the input current is transferred to the output via one or the other of the current mirrors depending on whether the input signal voltage is greater than or less than an input reference voltage and therefore the current is positive or negative.

45 Claims, 7 Drawing Sheets

5,812,014

DOUBLE HALF-WAVE RECTIFIER CIRCUIT HAVING A WIDE INPUT DYNAMIC RANGE

CROSS REFERENCE TO RELATED APPLICATIONS

This application claims priority from EP 95830419.8, filed Oct. 9, 1995.

BACKGROUND AND SUMMARY OF THE INVENTION

The present invention relates in general to a rectifier circuit operable to rectify an electrical signal. More specifically the present invention comprises a circuit operable to rectify a signal which varies in the region of half of a supply voltage and with a dynamic range equal to that of the supply voltage itself; and provides a rectified voltage which is positive with respect to ground.

Devices able to perform these functions are known in the art. One of the most widely utilized devices is that shown in FIG. 1. This device comprises a rectifier circuit for an input voltage Vin, which has an output referred to a virtual ground, for example 2.5 volts in the case of a 5 volt supply. A second circuit is, therefore, necessary to translate the virtual ground, in such a way that the output Vout is referred to zero volts.

A more rational device is that represented in FIG. 2 and described in "Full-Wave Precision Rectification that is Performed in Current Domain and Very Suitable for CMOS Implementation" by Zhenhua Wang in IEEE Transaction on circuits and systems—I: Fundamental theory and applications, vol. 39, No. 6, June 1992, which is hereby incorporated by reference. This device, however, has the disadvantage of having a limited input dynamic range.

A further device known in the art is that shown in FIG. 3, in which the input is current Iin, and is described in "BICMOS Current Buffer-Rectifier" by J. Ramirez-Angulo in IEEE Transactions on circuits and systems—I: Fundamental theory and applications, Vol.39, No. 10, October 1992, which is hereby incorporated by reference. This device, however, does not allow the earth of the output signal to be translated to zero volts.

The object of the present invention is to provide a device in which the above-mentioned disadvantages can be resolved, and which can be made in a simple and economic manner.

According to the present invention this object is achieved by a device having the characteristics specifically set out in the following claims.

BRIEF DESCRIPTION OF THE DRAWING

The invention will now be described purely by way of non-limitative example, with reference to the attached drawings, in which.

DETAILED DESCRIPTION

Figure 1:
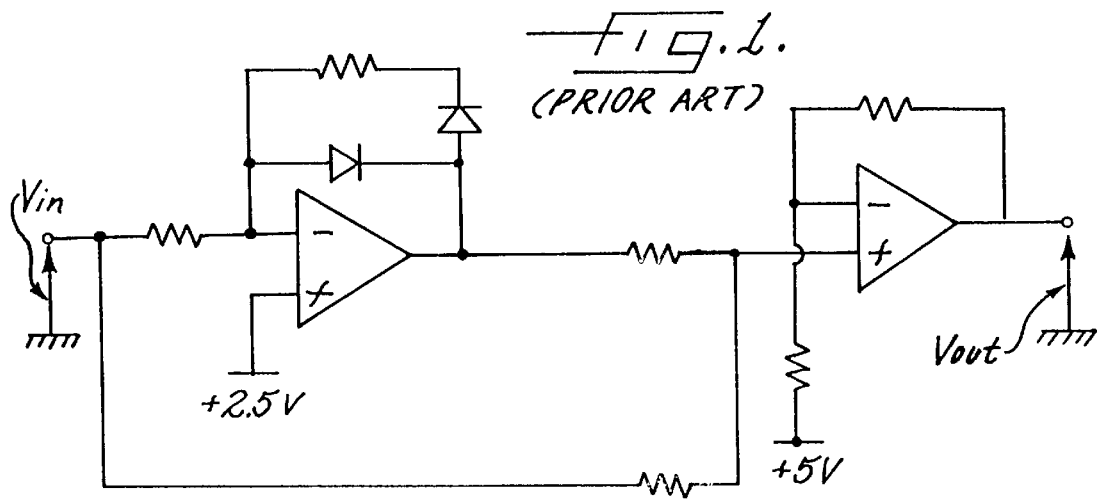
FIGS. 1, 2 and 3 are schematic circuit diagrams of prior art devices and have already been described;.
Figure 2:
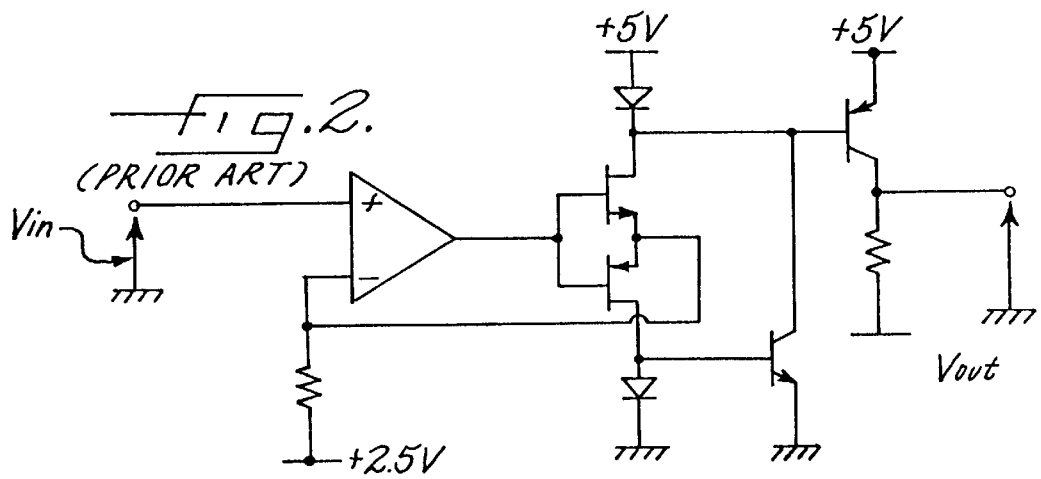
Figure 3:
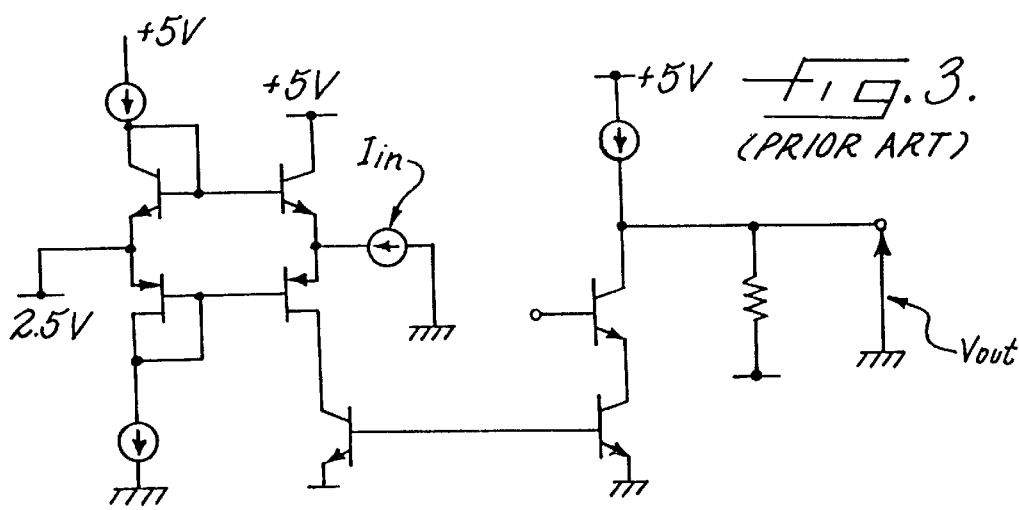
Figures 4, 4A:
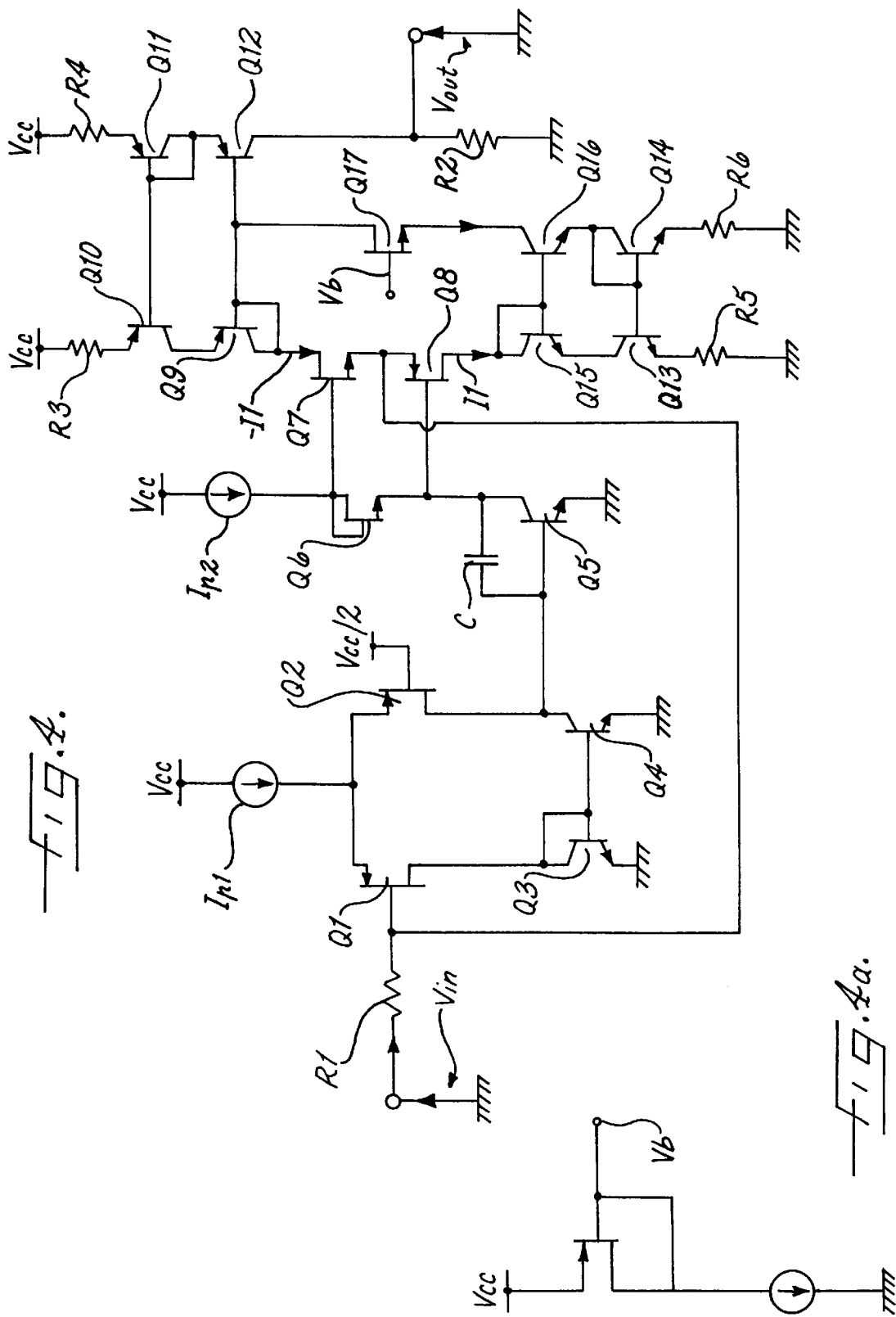
FIG. 4 is a circuit diagram of an embodiment of the circuit according to the present invention.

One embodiment of the circuit according to the invention is shown in FIG. 4. In this embodiment the input voltage Vin is applied to one terminal of a resistor R1. The other terminal of the resistor R1 is maintained at a virtual ground voltage Vcc/2 equal to half the supply voltage Vcc of the circuit.

From here on the description will make reference exclusively to a supply voltage Vcc of 5 volts for which reason a virtual ground voltage Vcc/2 of 2.5 volts is chosen. It will naturally be understood that these values are purely by way of example and can be varied if, for example, different supply voltages were used.

The virtual ground voltage Vcc/2 of 2.5 volts is also applied to the gate terminal of a transistor Q2. In fact, the terminal of the resistor R1 connected to the gate of the transistor Q1 is maintained at the voltage of 2.5 volts by means of a differential amplifier constituted by the components: Ip1, Q1, Q2, Q3, Q4, Q5, Q6, Ip2, C, Q7 and Q8. As understood by those skilled in the art, Ip1 and Ip2 are constant current generators and the transistors Q1, Q2, Q6 are of MOS type whilst the transistors Q3, Q4, Q5 are bipolar transistors and C is a capacitor for retaining a charge for a selected amount of time.

Through the source terminals of two MOS type transistors Q7 and Q8 this differential amplifier is able to deliver or absorb current from the node to which the gate terminal of the transistor Q1 and the resistor R1 is connected. This takes place via the path constituted by the bipolar transistors Q9 and Q10 and a resistor R3 leading to a supply terminal Vcc and, respectively, via the path constituted by two bipolar transistors Q15, Q13 and a resistor R5 leading to ground. Since no current can pass through the gate terminal of the transistor Q1, a current I1, as indicated in FIG. 4 (with the sense indicated in FIG. 4 I1 is positive for Vin>2.5 volts) flows through the transistor Q8 and into the ground terminal passing through the input of a current mirror constituted by transistors Q15, Q16, Q13, Q14 of bipolar type and Q17 of MOS type, and resistors R5 and R6.

The output of this current mirror goes to the input of a second current mirror constituted by bipolar transistors Q9, Q10, Q11, Q12 and resistors R3 and R4 the output of which applies the current I1 to a resistor R2 from the terminals of which can be taken the output voltage Vout of the rectifier circuit.

If, instead, the input voltage Vin is less than 2.5 volts the current I1 is of opposite sign from that indicated in FIG. 4 (−I1). In this case the current is provided by the transistor Q7, and via the current mirror constituted by the transistors Q9, Q10, Q11 and Q12 and resistors R3 and R4, it is applied to the resistor R2 with the same sign as in the preceding case. In this way the rectification function of the input voltage Vin is therefore achieved.

Supposing that the current I1 in the resistor R1 is reproduced at the resistor R2 without errors, on the basis of the preceding considerations, the following analytical expressions apply:

If: $Vin > Vcc/2$ $I1 = (Vin - Vcc/2)R1$ $Vout = \dfrac{R2}{R1}(Vin - Vcc/2)$

-continued $$Iu = I1$$

If: $Vin < Vcc/2$ $$I1 = -((Vcc/2) - Vin)/R1$$

$$Vout = \frac{R2}{R1}((Vcc/2) - Vin)$$

$$Iout = -I1$$

One can therefore deduce that:

$$Vout = \frac{R2}{R1}\{|Vin - Vcc/2|\}$$

The previously-made supposition that the current I1 is mirrored, without errors, in the resistor R2 is based on the fact that the gate terminal of the transistor Q1 does not absorb any current. Therefore all the current I1 finishes on the source terminals of the transistors Q8 and Q7 (according to the sign of I1). The current at the source terminals of these two transistors is faithfully related to the respective drain terminals in that for MOS type transistors (such as the transistors Q7 and Q8) the input at the source terminal current is exactly equal to the output current from the drain terminal since the gate terminal is isolated and therefore no current can flow from it. This guarantees that the current I1 is mirrored without errors in transistor R2 as previously stated.

The current from the drain terminals of the transistors Q7 and Q8 is passed to a current mirror which compensates the base current Ib of the bipolar transistors, so that the output current is not affected by errors due to the base current Ib (the base biasing current of a bipolar transistor). This is possible in that the output of the lower current mirror constituted by the transistors Q13, Q14, Q15, Q16 sees an almost constant voltage. This ensures that the output of this lower current mirror can be acted on by a second stage, of Wilson type constituted by the transistor Q17 which contributes to a further reduction in the Early effect of the lower current mirror. This arrangement does not compromise any of the input or output dynamics. The gate voltage Vb provided to the transistor Q17 can be any biasing voltage as long as it keeps the transistor Q17, the output of the lower current mirror Q13, Q14, Q15, Q16 and the input of the upper current mirror Q9, Q10, Q11, Q12 working in a linear zone. In order that this condition is respected the voltage Vb must lie in an interval the minimum and maximum values of which are defined by the two following relations:

$$Vb(\min) \geq Vce_{sat}(Q16) + Vbe(Q14) + VR6$$

$$Vb(\max) \leq Vcc - Vbe(Q9) - Vbe(Q10) - VR3 + Vgs(Q17) - Vds_{sat}(Q17)$$

The voltage Vb can therefore be obtained by means of a simple biasing circuit, for example of the type shown in FIG. 4a. Moreover the error due to the Early effect is limited in that the current mirrors are disposed in Wilson-type configuration. The Wilson-type circuit is constituted by transistors Q9 and Q12 for the upper current mirror and by transistors Q15, Q16 and Q17 for the lower current mirror.

All these arrangements are easily employed with the circuit according to the invention in that the node represented by the source terminals of transistors Q7 and Q8 is maintained by the differential amplifier, as previously mentioned, at a constant voltage equal to the voltage on the gate terminal of the transistor Q2, which in this specific case is 2.5 volts, the virtual ground voltage Vcc/2.

Since this voltage remains constant whatever the value of the input voltage Vin, the source terminals of the transistors Q7 and Q8 experience the whole of the dynamic range of the voltage necessary to pilot a Wilson-type configuration current mirror, as described hereinabove. Moreover, since the gate terminal of the transistor Q1 also remains at a constant voltage of 2.5 volts whatever value is assumed by the input voltage Vin, the differential amplifier stage has no criticality in the dynamic range of the voltage at its inputs.

In this way the input voltage Vin can without difficulty reach both the ground voltage and the supply voltage Vcc without any component of the circuit according to the invention going outside its linear operating range. Even the output stage of the circuit does not depart from its linear operating range if the resistor R2 is correctly dimensioned.

Figure 5:
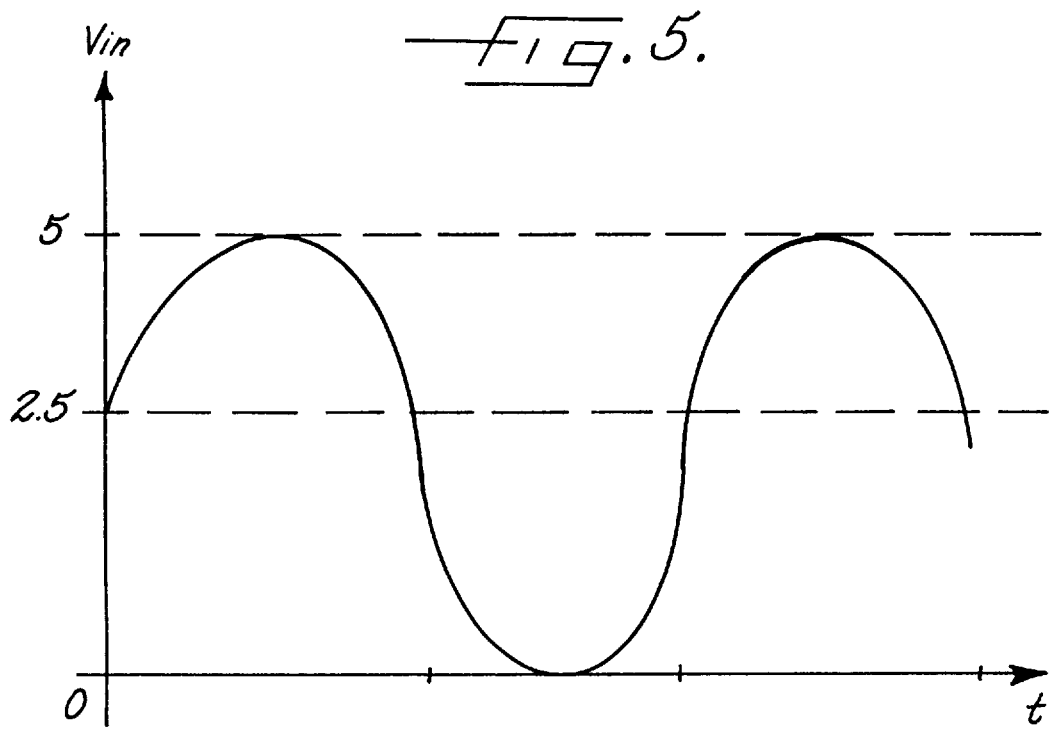
FIGS. 5 and 6 are diagrams illustrating the operation of the circuit according to the invention.

If R1=R2 the output voltage Vout is at most equal to 2.5 volts for values of the input voltage Vin which reach both Vcc and ground. In this respect see the graphs of FIGS. 5 and 6. In FIG. 5 is shown the input voltage Vin as a function of time t, while FIG. 6 shows the corresponding rectified output voltage Vout.

Figure 6:
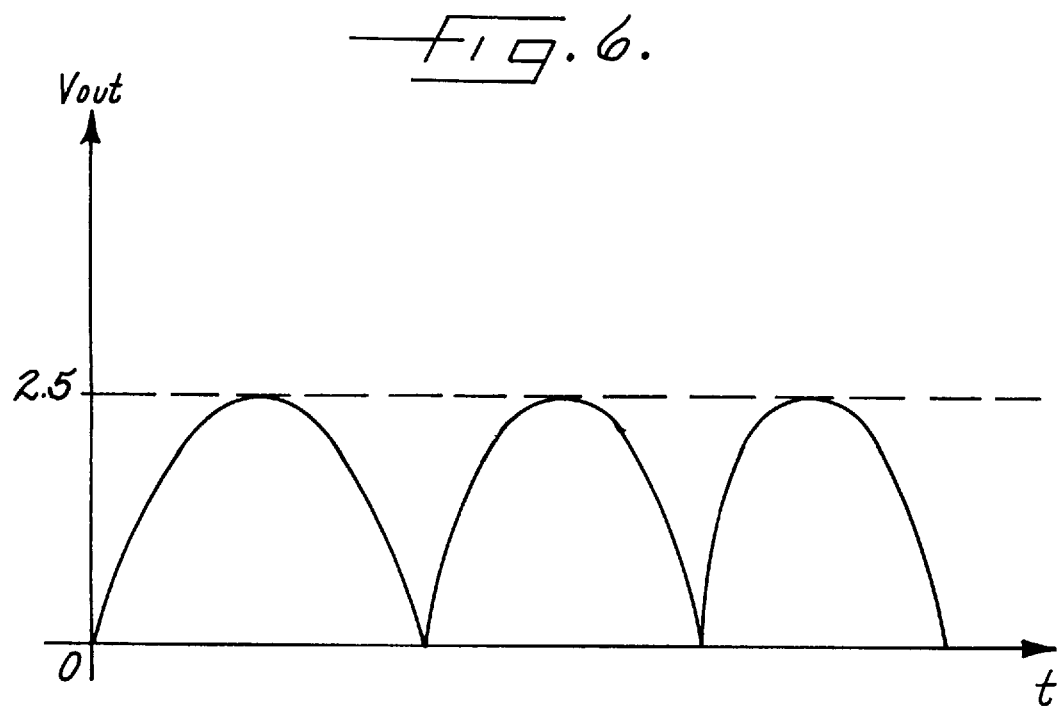

If, on the other hand, R2>R1 the maximum value of the output voltage Vout will be very much higher than the 2.5 volts indicated in FIG. 6.

The maximum value which can be reached by the output voltage Vout depends on the dynamic range of the voltage of the output stage, and its value determines the maximum value of the resistor R2 for which the output stage is still in its linear operating region.

In fact:

$$Vout(\max) = Vcc - V_{R4} - V_{BE}(Q11) - VCE_{sat}(Q12)$$

from which:

$$R2(\max) = \frac{Vout(\max)}{Vin(\max) - Vcc/2} \cdot R1$$

where a supply voltage Vcc of 5 volts gives:

Vin(max)=5 volts e Vin(min)=0 volt.

Finally, crossover distortion is limited by the transistor Q6 which is of MOS type. In fact, the transistor Q6 fixes a given potential difference between the gate terminals of the transistors Q6 and Q8, which brings them close to conduction. This distortion further reduces if, rather than the single transistor Q7 of MOS type between the gate terminals of the transistors Q7 and Q8, use is made of two MOS type transistors, one of P type and the other of N type, connected in diode configuration, that is to say with the gate terminal short circuited with respect to the drain terminal.

This arrangement has been deliberately avoided in the specific embodiment described here since the use of two MOS type transistors leads to the transistors Q7 and Q8 conducting a certain current at rest with an input voltage Vin equal to 2.5 volts. This rest current naturally transforms into an output voltage offset. In fact this rest current would be mirrored on the resistor R2 and therefore multiplied by a factor of 2 in that this rest current is mirrored both by the upper current mirror and by the lower current mirror, thereby generating an output voltage even with an input voltage Vin equal to 2.5 volts which is the input signal condition to rectify equal to zero volts. In these input voltage conditions of Vin the output voltage Vout would instead have to be zero volts.

The rectifier circuit according to the present invention has the advantage of having a wide input dynamic range, well beyond the supply voltage, and the possibility of easily adjusting both an input virtual ground and an output virtual ground. The circuit further has a high precision and can be made with a minimum number of components with respect to the prior art.

As far as the dynamic range of the input voltage is concerned, it is useful to specify that it can go beyond the supply voltage as far as the ratio R2/R1 and the output dynamic range allow, as long as the resistor terminal R1 connected to the input can exceed the supply voltage. This condition is always satisfied if R1 is a discrete resistor, while if R1 is an integrated resistor this is still true if it is possible, in the integration technology used, to isolate the terminal of the resistor R1 which is connected to the input.

The high precision of the transfer function of the circuit according to the present invention depends essentially on the precision of the ratio between the two resistors R1 and R2. This ratio can be controlled with high precision if the circuit is made as an integrated circuit since in this case a tolerance of less than 1% in the ratio between the values of the two resistors R1, R2 can be obtained with relative ease. This precision can however be obtained equally easily utilizing discrete components to form the resistors R1, R2 by using resistive networks rather than individual resistors.

As mentioned above, crossover distortion can be contained by use of the transistor Q6 which biases the transistors Q7 and Q8 close to the active region. Crossover distortion can be completely eliminated if it is acceptable to have an output voltage different from zero with a nil input signal (in the case of the embodiment of FIG. 4). Crossover distortion can therefore be completely eliminated provided that an output voltage offset is accepted. As mentioned, in order to eliminate crossover distortion it is sufficient to substitute the transistor Q6 with a pair of MOS transistors (one of N type and one of P type) connected in diode configuration. This is also possible if the transistor Q6 is of bipolar type.

Figure 7:
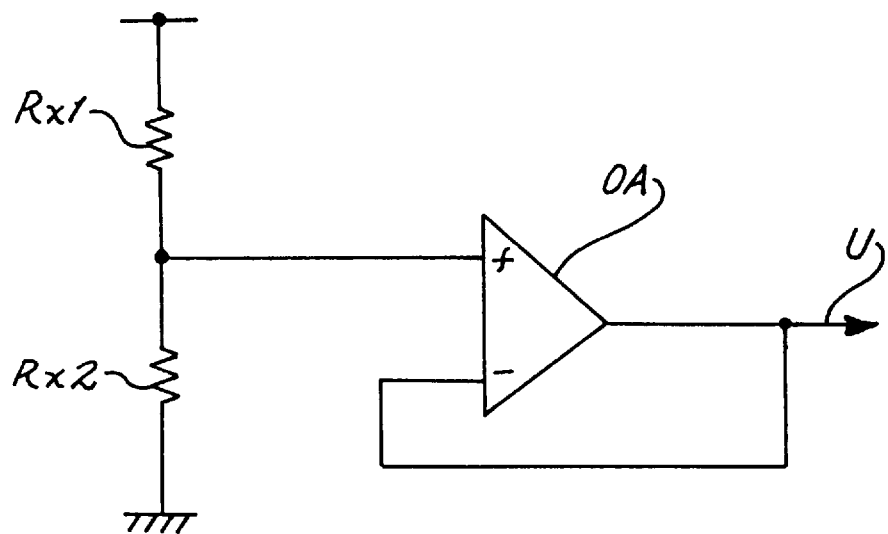
FIG. 7 is a circuit diagram of two alternative embodiments of a portion of the circuit according to the invention.
Figure 7:
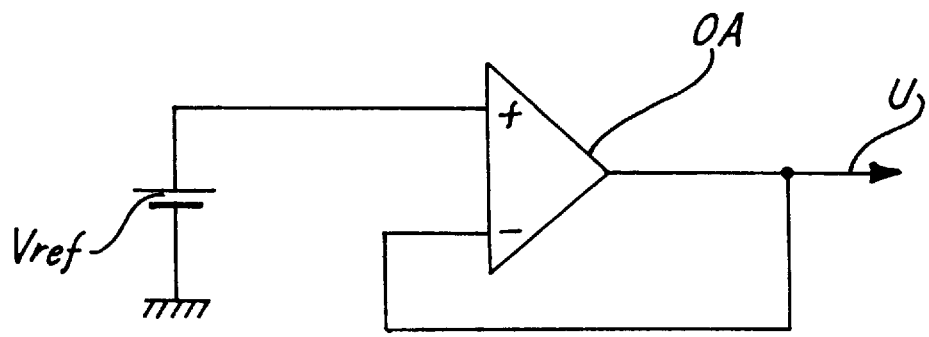

The circuit according to the invention also allows the input signal ground to be equal to the voltage on the gate terminal of the transistor Q2, in the embodiment described equal to 2.5 volts. This voltage value can be varied, taking account of the input dynamic range of the differential amplifier formed by Q1, Q2, Q3, Q4 and Ip1 simply by varying the voltage on the gate terminal of the transistor Q2. It is also possible to have an output reference different from ground in the circuit according to the present invention. This is possible, however, at the price of a reduced output dynamic range. To do this it is sufficient to connect the terminal of the resistor R2 (connected to ground in FIG. 4) to a voltage reference such as, for example, those represented in FIG. 7. The circuits of FIG. 7 use an operational amplifier OA to connect a voltage reference, carried on an output terminal U, to the resistor R2. To obtain the voltage reference a resistive divider Rx1, Rx2 can be used or a voltage source Vref of known type. It will moreover be noted that the circuit according to the present invention advantageously uses a cascode configuration current mirror with biasing current compensation achieved with the bipolar transistors Q9, Q10, Q11, Q12 and the resistors R3, R4. This current mirror is combined with a second current mirror similar to the first, but referred to the ground voltage, constituted by transistors Q13, Q14, Q15, Q16 and resistors R5 and R6 as well as transistor Q17, operable to increase further the output impedance of this latter current mirror.

Both the current mirrors have the purpose of transferring the current which flows through the transistor Q7 or the transistor Q8, depending on the sign of the input voltage, to the resistor R2. Moreover, the transistor Q17 being of MOS type does not add any biasing current to the output of the current mirror Q13, Q14, Q15, Q16, R5, R6 thereby maintaining without error the compensation of the biasing currents achieved by means of this current mirror. The transistors Q9, Q10, Q11, Q12 and Q13, Q14, Q15, Q16 can also be of MOS type rather than bipolar transistors as described.

The structure formed by the transistors Q7 and Q8 and controlled by the differential amplifier formed by the transistors Q1, Q2, Q3, Q4, Q5, Q6 and the current generators Ip1, Ip2 transfer the positive input current I1 through the transistor Q8 to the current mirror referred to ground (Q13, Q14, Q15, Q16, R5, R6) and transfer the negative current I1 through the transistor Q7 to the current mirror referred to the supply voltage Vcc (Q9, Q10, Q11, Q12, R3, R4) without introducing errors due to biasing since the transistors Q7 and Q8, being high input impedance devices, introduce no biasing currents nor any paths along which the current I1 can flow. The transistors Q7 and Q8 can be replaced by other similar devices as long as they have a high input impedance.

The structure formed by the differential amplifier Q11 Q2, Q3, Q4, Q5, Q6, Ip1, Ip2, C, combined with the structure constituted by transistors Q7 and Q8 ensure that the current I1 which flows through the resistor R1 (equal to (Vin−2.5)/R1) is transferred to the transistors Q7 or Q8 without error due to the biasing currents of the input stage of the differential amplifier constituted by the transistors Q1 and Q2. In fact, since the transistors Q7 and Q8 are of MOS type they do not require biasing currents on their inputs which would alter the current I1. In this case, too, similar devices could be used in place of the transistors Q1 and Q2 as long as they have a high input impedance in such a way as to present nil biasing currents.

Figure 8:
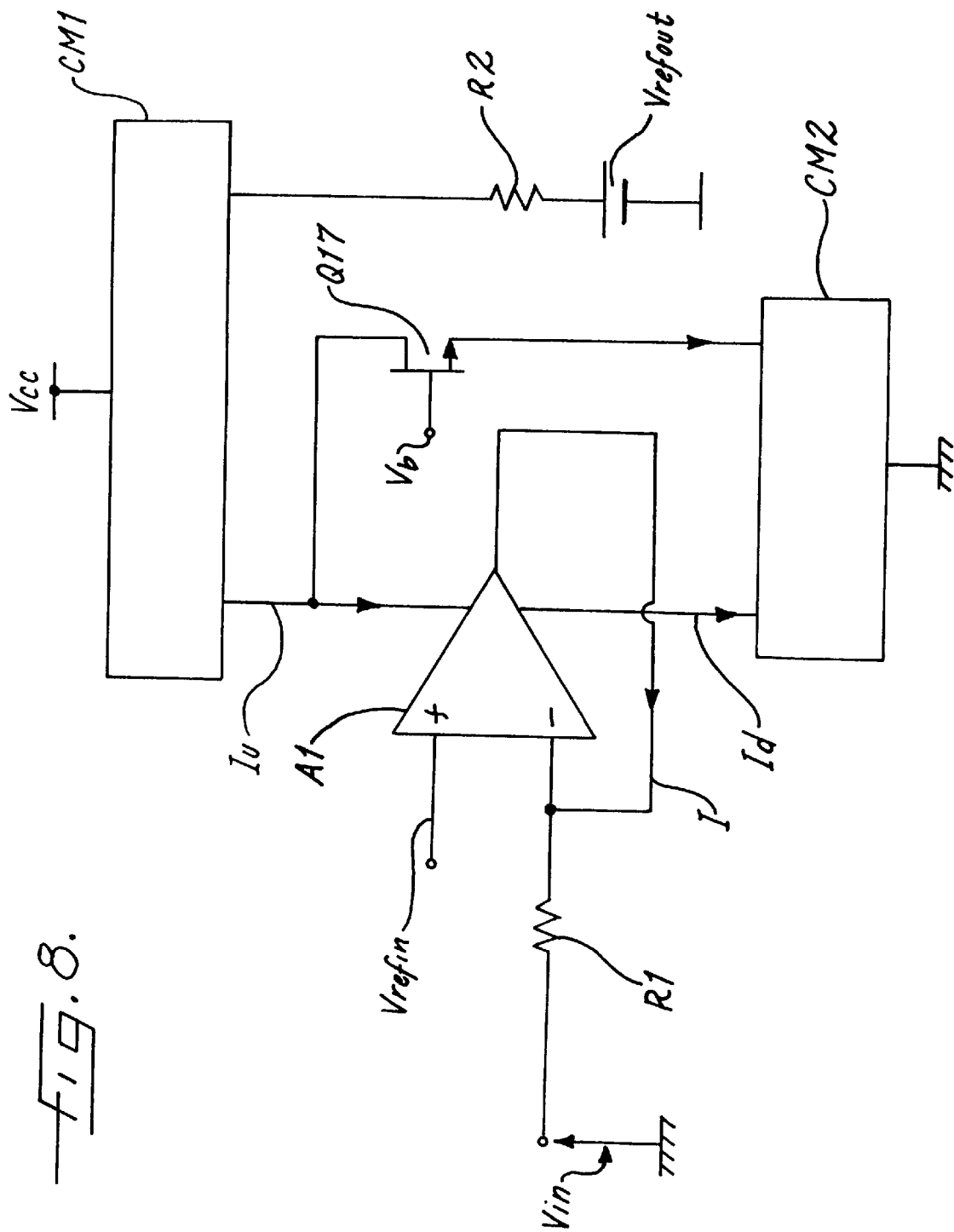
FIG. 8 is a block schematic diagram of an embodiment of the circuit according to the invention.

In general, therefore, the structure of the circuit according to the present invention can be generalized according to the diagram shown in FIG. 8. In this Figure, the block A1 represents a particular amplifier characterized by three outputs Iu, I, Id. In FIGS. 9, 10, 11 and 12 are shown four possible embodiments of the amplifier A1. In these Figures Ad is an amplifier, for example a differential amplifier, Qdr is for example any active device such as a transistor, not necessarily a bipolar type, Ia can be a current amplifier or a biasing resistor, Vp is a voltage generator and can be formed as described above by means of a transistor of MOS type (Q6) or two MOS type transistors in diode configuration. Qmn and Qmp are two MOS transistors of N and P type respectively, or similar active devices as long as they have a high input impedance (or equivalently a zero biasing current).

Figure 9:
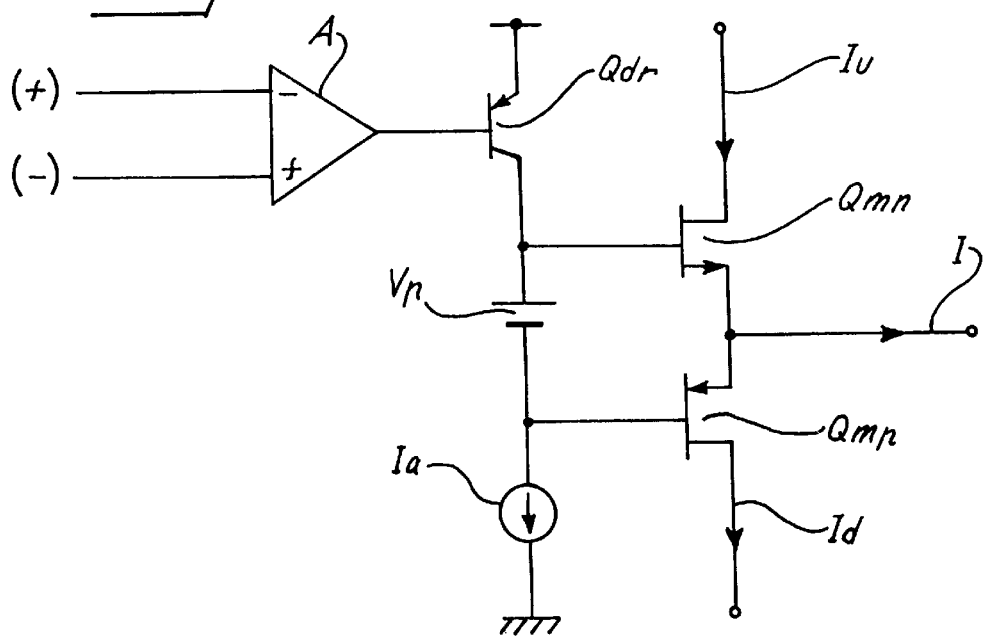
FIGS. 9, 10, 11 and 12 are circuit diagrams of alternative embodiments of portions of the circuit according to the invention.
Figure 10:
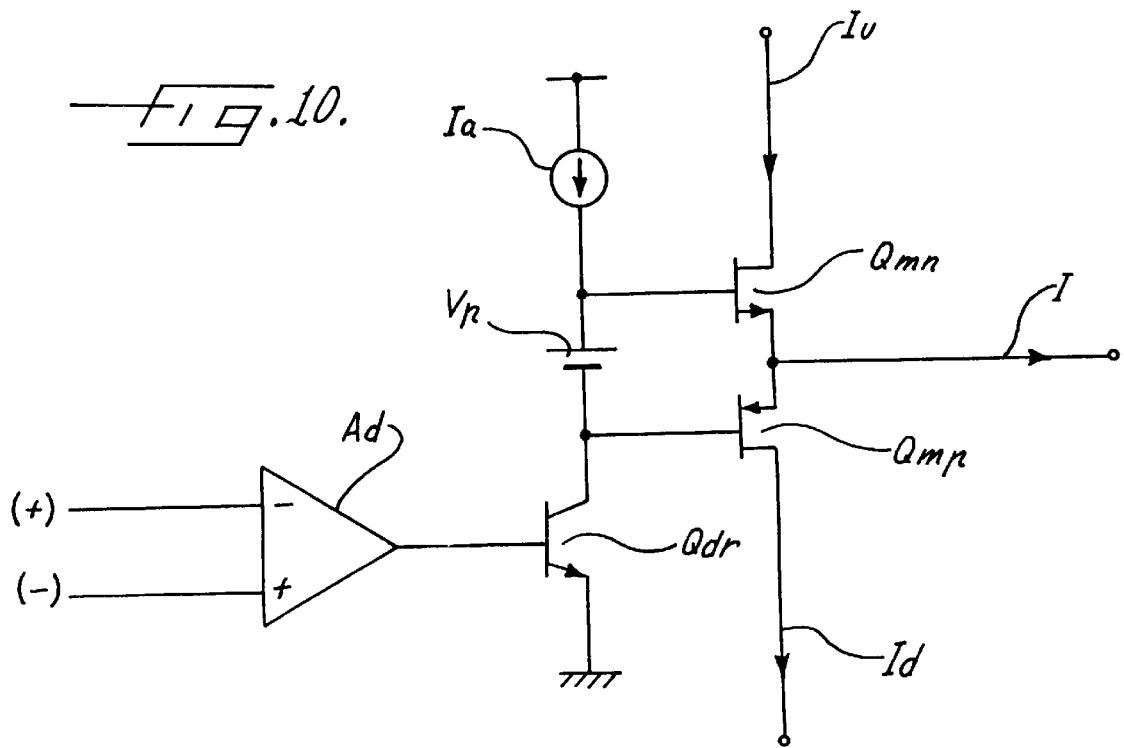
Figure 11:
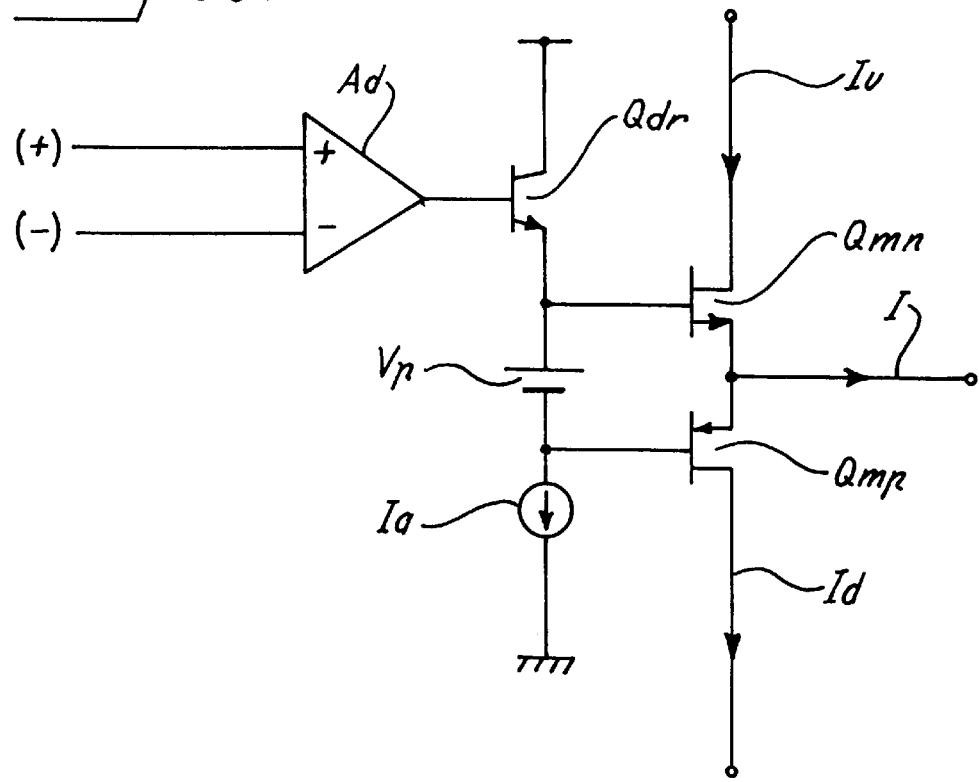
Figure 12:
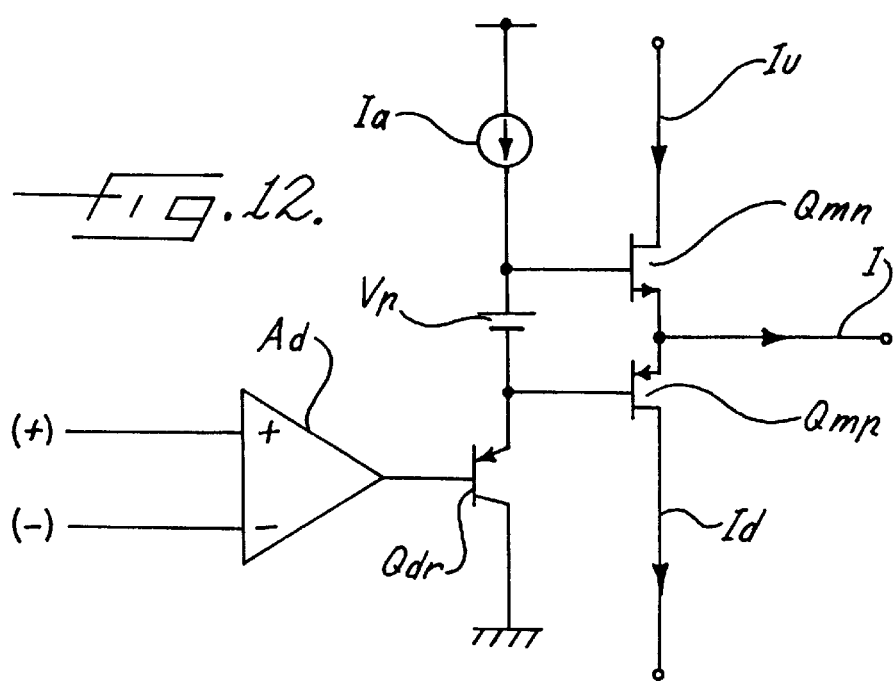

It will be observed how the circuit of FIG. 8, comprising an amplifier A1 formed for example as illustrated in FIGS. 9 and 12, functions according to the same principle as the circuit shown in FIG. 4. In fact, the input current I is transferred without errors to Iu or to Id depending on whether the input voltage Vin is less or greater than an input reference voltage Vrefin (in the case of the circuit of FIG. 4 the input reference voltage is Vcc/2). The current Iu or the current Id is then mirrored by an upper current mirror CM1 or by a lower current mirror CM2 respectively on the output resistor R2. The resistor R2 can in turn be connected to an output reference voltage Vrefout, provided for example by the circuits shown in FIG. 7 if it is desired to shift the output ground.

It is evident how the circuit according to the present invention can be formed equally well in integrated or hybrid technology or using discrete components.

Naturally, the principle of the invention remaining the same, the details of construction and the embodiments can be widely varied with respect to what has been described and illustrated, without departing from the ambit of the present invention.

What is claimed is:

1. A rectifier circuit operable to emit an output signal by double half-wave rectifying and shifting the ground of an input signal, the rectifier circuit comprising:

an amplifier having a first input terminal to which the input signal is supplied and a second input terminal to which an input reference voltage is supplied, said first input terminal being maintained at the input reference voltage and having a very high input impedance;

a first resistor connected to said first input terminal of said amplifier and through which the input signal is provided to said first input terminal of said amplifier;

a second resistor connected to the output of the circuit;

first and second current mirrors operatively connected to said amplifier and to said second resistor, the first current mirror being connected to a supply voltage and the second current mirror being connected to ground, said amplifier being configured in such a way as to transfer a current, flowing through said first resistor, to the said first and second current mirrors, said first and second current mirrors being configured to mirror the current through said second resistor always with the same sign independently of the sign of the said current through said first resistor, and wherein said amplifier includes an output stage comprising at least two MOS-type transistors connected in series between a branch of the first current mirror and a branch of the second current mirror, at least one constant current generator positioned to connect to a supply voltage, and at least two transistors connected to the at least one constant current generator.

2. A circuit according to claim 1, wherein the said first and second current mirrors are disposed in a configuration of the Wilson type.

3. A circuit according to claim 1, wherein said amplifier is configured in such a way as to:

transfer the current to said first current mirror if the input voltage is less than the input reference voltage, the first current mirror being configured in such a way as to mirror the current through said second resistor with inverted sign, and transfer the current to said second current mirror if the input voltage is greater than the input reference voltage, said second current mirror being configured in such a way as to mirror the current through said second resistor with the same sign.

4. A circuit according to claim 1, wherein the said amplifier is configured in such a way as to maintain its said first input terminal at a constant voltage equal to said input reference voltage.

5. A circuit according to claim 1, wherein the current is mirrored through said second resistor, always with the same sign, towards a ground terminal to which said second resistor is connected.

6. A circuit according to claim 1, wherein the current is mirrored through said second resistor, always with the same sign, towards an output reference voltage source to which said second resistor is connected.

7. A circuit according to claim 1, wherein said amplifier is configured in such a way as to:

absorb the current from a first branch of said first current mirror, said first current mirror being configured in such a way as to cause a current equal to the current to flow towards said second resistor in a second branch if the input voltage is less than the input reference voltage, and introduce the current into a first branch of said second current mirror, said second current mirror being configured in such a way as to cause a current equal to the current to flow in its second branch the second branch of said second current mirror being connected to the first branch of said first current mirror in such a way as to absorb from it a current equal to the current if the input voltage is greater than the input reference voltage.

8. A circuit according to claim 7, wherein said first current mirror includes bipolar transistors, said circuit being configured in such a way as to compensate the base currents of said bipolar transistors.

9. A circuit according to claim 8, wherein said second current mirror includes bipolar transistors configured in such a way as to compensate the base current and at the same time increase the output resistance of said second current mirror by means of a transistor.

10. A circuit according to claim 1, wherein said amplifier has a high input impedance.

11. A circuit according to claim 10, wherein said amplifier uses a gate terminal of a transistor of MOS type as the input terminal for the input signal.

12. A circuit according to claim 10, wherein the input terminal of said amplifier, for the input signal, is connected to said first and second current mirrors in such a way that the current is transferred to said first and second current mirrors through said first resistor.

13. A circuit according to claim 1, wherein said at least two MOS-type transistors of the output stage of said amplifier are are complementary to one another.

14. A circuit according to claim 1, further comprising biasing means operable to bias said at least two MOS-type transistors of the output stage of said amplifier for the purpose of eliminating crossover distortion.

15. A circuit according to claim 14, wherein said biasing means include an MOS type transistor.

16. A circuit according to claim 14, wherein said biasing means includes at least one MOS type transistor connected in a diode configuration.

17. A circuit according to claim 1, wherein said circuit is made in integrated form.

18. A circuit according to claim 1, wherein said circuit is made in hybrid form.

19. A circuit according to claim 1, wherein the circuit is formed by use of discrete components and said first and second resistors define a resistor network.

20. A circuit according to claim 1, wherein said input reference voltage is a voltage having a value less than and the same sign as a circuit supply voltage.

21. A circuit according to claim 20, wherein said input reference voltage is equal to half the supply voltage.

22. A rectifier circuit, comprising:

an amplifier having a first input connected to receive a reference voltage, a second input connected to receive an input voltage, and an output connected to deliver an input current, the output including at least two active semiconductor devices each having a relatively high input impedance;

a first resistor connected to said second input of said amplifier; and first and second current mirror circuits connected to alternatively mirror said input current on a second resistor, said first current mirror circuit being connected to a supply voltage, said second current mirror circuit being connected to ground, said second resistor being connected to an output terminal of the rectifier circuit;

wherein said at least two active semiconductor devices of said output of said amplifier are connected in series between a branch of the first current mirror circuit and a branch of the second current mirror circuit, said amplifier further having at least one constant current generator positioned to connect to a supply voltage, and at least two transistors connected to the at least one constant current generator;

wherein said first current mirror circuit mirrors said input current when said input voltage has a value less than said reference voltage; and wherein said second current mirror circuit mirrors said input current when said input voltage has a value greater than said reference voltage;

whereby an output voltage having a positive value respective to ground is produced at said output terminal.

23. The rectifier circuit of claim 22, wherein said amplifier comprises a differential amplifier, a first transistor connected to receive an output signal of said differential amplifier, a current amplifier operatively connected to a current-carrying terminal of said first transistor and to a supply voltage, a voltage generator operatively connected to said current-carrying terminal of said first transistor and said current amplifier, second and third transistors each having a current-carrying terminal thereof connected to deliver said input current to said first and second current mirrors respectively, said second transistor having a control terminal thereof connected to said voltage generator and said current-carrying terminal of said first transistor, said third transistor being connected between said voltage generator and said current amplifier.

24. The rectifier circuit of claim 23 wherein said differential amplifier comprises first and second MOS transistors each having a first current-carrying terminal thereof connected to a constant current generator, said first MOS transistor having a control terminal thereof connected to receive said input voltage and a second current-carrying terminal thereof connected to a collector terminal of a respective first bipolar transistor, said second MOS transistor having a control terminal thereof connected to receive said reference voltage and a second current-carrying terminal thereof connected to a collector terminal of a respective second bipolar transistor, said first and second bipolar transistors having their base terminals connected together and their emitter terminals connected to ground, said first bipolar transistor having its base terminal connected to its collector terminal.

25. The rectifier circuit of claim 23, wherein said voltage generator is a MOS type transistor.

26. The rectifier circuit of claim 23, wherein said amplifier further comprises a capacitor connected between a control terminal of said first transistor and said current-carrying terminal of said first transistor.

27. The rectifier circuit of claim 22, wherein said first and second current mirror circuits are disposed in a Wilson-type configuration, said second current mirror circuit having a Wilson-type circuit comprising two bipolar transistors having the respective gates thereof connected together and a MOS transistor having a first current-carrying terminal thereof operatively connected to a current-carrying terminal of one of said bipolar transistors, a second current-carrying terminal thereof operatively connected to said second current mirror circuit, and a control terminal thereof connected to receive a biasing voltage.

28. The rectifier circuit of claim 22, wherein said second current mirror circuit comprises two pairs of bipolar transistors, each of said pair of transistors being connected to ground through a respective resistor and having one of its transistors connected as a diode; and a MOS transistor operatively connected between one of said pairs of bipolar transistors and said first current mirror circuit.

29. The rectifier circuit of claim 22, wherein said first current mirror circuit comprises two pairs of bipolar transistors, each of said pair of transistors being connected to a supply voltage through a respective resistor and having one of its transistors connected as a diode.

30. The rectifier circuit of claim 22, wherein said second resistor is connected to an output reference voltage.

31. The rectifier circuit of claim 22, wherein the value of said reference voltage is equal to one-half of the value of said supply voltage.

32. The rectifier circuit of claim 22, wherein said input current is mirrored through said second current mirror circuit and said first current mirror circuit before being applied to said second resistor when said input voltage has a value greater than said reference voltage.

33. The rectifier circuit of claim 22, wherein the resistance of said first resistor is equal to the resistance of said second resistor.

34. A method for rectifying a signal, comprising the steps of:

applying an input voltage and a reference voltage to an amplifier, said input voltage being provided through a first resistor, said amplifier having an output connected to deliver an input current, the output including at least two active semiconductor devices each having a relatively high input impedance; and mirroring said input current on a second resistor using either a first or a second current mirror circuit, said first current mirror circuit being connected to a supply voltage, said second current mirror circuit being connected to ground, said second resistor being connected to an output terminal;

wherein said at least two active semiconductor devices of said output of said amplifier are connected in series between a branch of the first current mirror circuit and a branch of the second current mirror circuit, said amplifier further having at least one constant current generator positioned to connect to a supply voltage and at least two transistors connected to the at least one constant current generator:

wherein said first current mirror circuit mirrors said input current when said input voltage has a value less than said reference voltage;

wherein said second current mirror circuit mirrors said input current when said input voltage has a value greater than said reference voltage;

whereby an output voltage having a positive value respective to ground is produced at said output terminal.

35. The method of claim 34, wherein said amplifier comprises a differential amplifier, a first transistor connected to receive an output signal of said differential amplifier, a current amplifier operatively connected to a current-carrying terminal of said first transistor and to a supply voltage, a voltage generator operatively connected to said current-carrying terminal of said first transistor and said current amplifier, second and third transistors each having a current-carrying terminal thereof connected to deliver said input current to said first and second current mirrors respectively, said second transistor having a control terminal thereof connected to said voltage generator and said current-carrying terminal of said first transistor, said third transistor being connected between said voltage generator and said current amplifier.

36. The method of claim 35 wherein said differential amplifier comprises first and second MOS transistors each having a first current-carrying terminal thereof connected to a constant current generator, said first MOS transistor having a control terminal thereof connected to receive said input voltage and a second current-carrying terminal thereof connected to a collector terminal of a respective first bipolar transistor, said second MOS transistor having a control terminal thereof connected to receive said reference voltage and a second current-carrying terminal thereof connected to a collector terminal of a respective second bipolar transistor, said first and second bipolar transistors having their base terminals connected together and their emitter terminals connected to ground, said first bipolar transistor having its base terminal connected to its collector terminal.

37. The method of claim 35, wherein said voltage generator is a MOS type transistor.

38. The method of claim 35, wherein said amplifier further comprises a capacitor connected between a control terminal of said first transistor and said current-carrying terminal of said first transistor.

39. The method of claim 34, wherein said first and second current mirror circuits are disposed in a Wilson-type configuration, said second current mirror circuit having a Wilson-type circuit comprising two bipolar transistors having the respective gates thereof connected together and a MOS transistor having a first current-carrying terminal thereof operatively connected to a current-carrying terminal of one of said bipolar transistors, a second current-carrying terminal thereof operatively connected to said second current mirror circuit, and a control terminal thereof connected to receive a biasing voltage.

40. The method of claim 34, wherein said second current mirror circuit comprises two pairs of bipolar transistors, each of said pair of transistors being connected to ground through a respective resistor and having one of its transistors connected as a diode; and a MOS transistor operatively connected between one of said pairs of bipolar transistors and said first current mirror circuit.

41. The method of claim 34, wherein said first current mirror circuit comprises two pairs of bipolar transistors, each of said pair of transistors being connected to a supply voltage through a respective resistor and having one of its transistors connected as a diode.

42. The method of claim 34, wherein said second resistor is connected to an output reference voltage.

43. The method of claim 34, wherein the value of said reference voltage is equal to one-half of the value of said supply voltage.

44. The method of claim 34, wherein said input current is mirrored through said second current mirror circuit and said first current mirror circuit before being applied to said second resistor when said input voltage has a value greater than said reference voltage.

45. The method of claim 34, wherein the resistance of said first resistor is equal to the resistance of said second resistor.

* * * * *